United States Patent [19]
Collins et al.

[11] Patent Number: 5,364,129
[45] Date of Patent: Nov. 15, 1994

[54] VEHICLE SAFETY BELT TENSIONING MECHANISM

[75] Inventors: Cecil A. Collins, Shelby; Dagoberto Krambeck, Troy, both of Mich.

[73] Assignee: General Safety Corporation, St. Clair Shores, Mich.

[21] Appl. No.: 143,299

[22] Filed: Oct. 26, 1993

[51] Int. Cl.$^5$ ............................................. B60R 22/36
[52] U.S. Cl. .................................. 280/806; 180/268
[58] Field of Search ................. 280/801, 806, 807; 180/268

[56] References Cited

U.S. PATENT DOCUMENTS

| | | | |
|---|---|---|---|
| 3,606,378 | 9/1971 | Prostran | 280/806 |
| 3,871,470 | 3/1975 | Schwanz et al. | 280/806 |
| 4,913,497 | 4/1990 | Knabel et al. | 297/480 |
| 4,917,210 | 4/1990 | Danicek et al. | 180/268 |
| 4,999,004 | 3/1991 | Skanberg et al. | 297/480 |
| 5,039,127 | 8/1991 | Föhl | 280/806 |
| 5,211,423 | 5/1993 | Krambeck | 280/806 |

FOREIGN PATENT DOCUMENTS

| | | | |
|---|---|---|---|
| 4224324 | 1/1993 | Germany | 280/806 |

OTHER PUBLICATIONS

*Popular Science*, "Automotive Newsfront", by Dan McCosh, Detroit Editor, Sep. 1989, p. 28.

*Primary Examiner*—Kenneth R. Rice
*Attorney, Agent, or Firm*—Harness, Dickey & Pierce

[57] ABSTRACT

The present invention is directed to a belt tensioning mechanism that is actuated in response to a vehicle deceleration exceeding a predetermined critical value for retracting the belt buckle so as to apply a tension loading on the safety belt for minimizing forward excursions of the seat occupant. The belt tensioning mechanism includes a sensor for sensing the magnitude of a vehicular deceleration and generating a deceleration signal indicative thereof, a lock plate fixed to the vehicle and having a series of locking apertures formed therein, a belt buckle supported for sliding movement on the lock plate from a normal position toward a retracted position, a latch mechanism coupled to the belt buckle and engageable with the locking apertures for permitting retraction of the belt buckle and lockingly retaining the belt buckle in the retracted position, a drive mechanism coupled to the belt buckle, a stored energy device acting on the drive mechanism and operable for displacing the drive mechanism so as to cause concurrent movement of the belt buckle from the normal position toward the retracted position, and an actuation mechanism for actuating the stored energy device in response to a deceleration signal indicative of a vehicular deceleration exceeded the predetermined critical value.

26 Claims, 4 Drawing Sheets

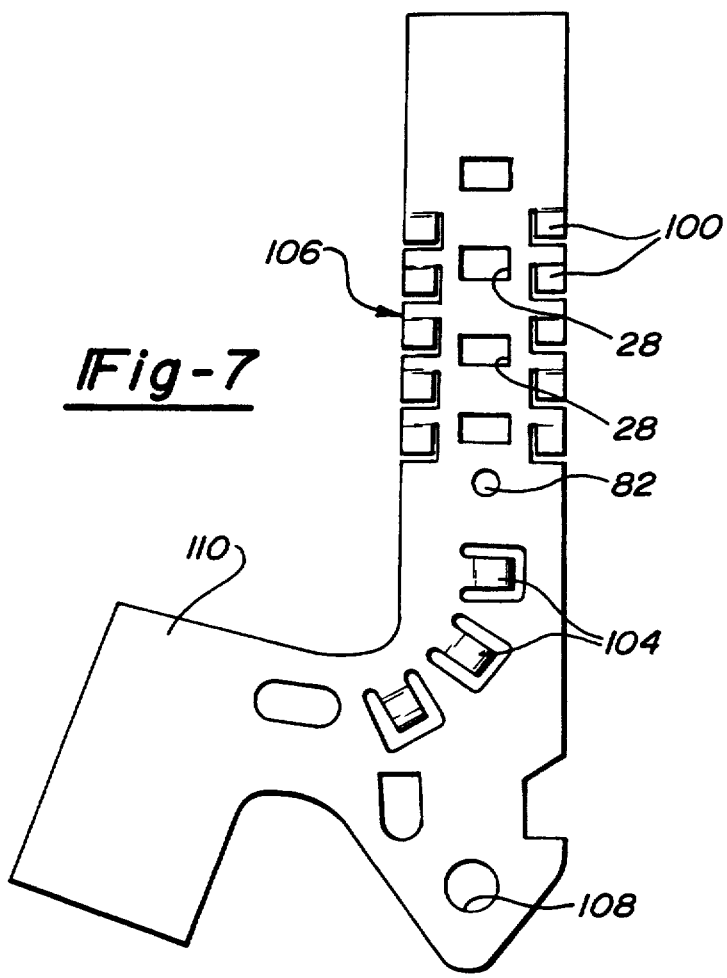
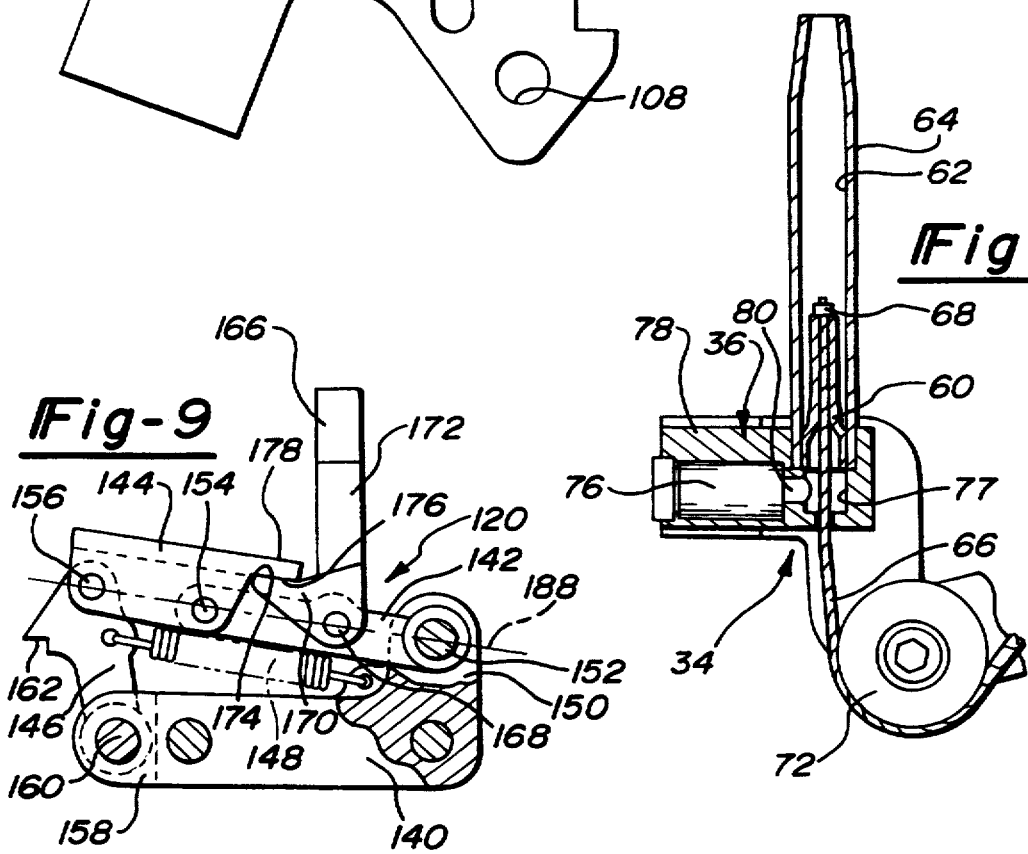

VEHICLE SAFETY BELT TENSIONING MECHANISM

BACKGROUND OF THE INVENTION

The present invention relates generally to safety belt restraint systems for motor vehicles and, more particularly, to a belt tensioning mechanism operable to automatically retract a belt buckle for tensioning the safety belt against the seat occupant in response to the vehicle being subjected to a deceleration force exceeding a predetermined critical value.

Modernly, virtually all motor vehicles are equipped with some type of passenger restraint system for physically restraining the seat occupant when the vehicle is subjected to high rates of deceleration which may occur, for example, during heavy braking or a collision. As is known, the most common type of passenger restraint system is a safety belt system having at least one of a lap belt and a shoulder belt, or a combination thereof, that can be withdrawn from a belt retractor for latched engagement with an anchored belt buckle. One type of belt retractor, commonly referred to as an "emergency locking retractor" (ELR), permits the seat belt to be freely withdrawn in response to movement of the seat occupant during normal operating circumstances, thereby providing increased comfort for the seat occupant. However, such emergency locking retractors commonly include an inertia-sensitive locking mechanism for automatically inhibiting withdrawal of the safety belt when the motor vehicle is subjected to deceleration forces exceeding a predetermined critical level. In addition, many belt retractors are also equipped with a tension relief device or so-called "comfort" mechanism which prevents the retractor from constantly exerting a tensioning force on the belt webbing which tends to be uncomfortable and annoying to the seat occupant. Typically, the "slack" generated by the comfort mechanism can be cancelled by withdrawing a relatively short length of the belt from the retractor.

While conventional belt retractors generally perform satisfactorily, the existence of "slack" in the seat belt (i.e., such as when the seat occupant is sitting forward in the seat) may permit the seat occupant to be thrown forward and collide with on-board structures when such an excessive deceleration force is exerted on the motor vehicle. To prevent such secondary impacts, the protection which is afforded by conventional safety belt restraint systems can be further enhanced by the use of a belt tensioning mechanism. In general, belt tensioning mechanisms function to automatically remove slack from the safety belt immediately after detection of such a deceleration force such that the seat occupant is physically restrained within the seat before being thrown forward due to the inertia of the collision.

Many conventional belt tensioning mechanisms are incorporated into the belt retractor and operate to retract the safety belt into the retractor upon detection of the deceleration force. Alternatively, it is also known to use a separate belt tensioning mechanism for causing retractive movement of the belt buckle such that existing "slack" in the safety belt is removed. For example, commonly owned U.S. Pat. No. 5,211,423 discloses a belt tensioning mechanism that is responsive to vehicle deceleration levels above a predetermined critical value for retracting the belt buckle so as to apply a "tensioning" load on the safety belt, thereby minimizing forward excursions of the seat occupant. More specifically, this system employs an inertia-sensitive triggering arrangement for actuating a preloaded drive mechanism in response to detection of the excessive deceleration force. In addition, a ratchet-type locking mechanism is also provided for maintaining the belt buckle in the retracted condition to inhibit subsequent forward movement of the belt buckle due to the loading exerted thereon by the seat occupant due to the inertia of the collision.

While such conventional buckle-type belt tensioning mechanisms are satisfactory for their intended purpose, a need exists to continuously develop new and improved belt tensioning mechanisms that enhance the overall effectiveness of safety belt restraint systems by decreasing the reaction time required to sense an excessive deceleration condition and retract the belt buckle.

SUMMARY OF THE INVENTION

Accordingly, the present invention is directed to a "buckle-type" belt tensioning mechanism that is actuated in response to vehicle deceleration levels exceeding a predetermined critical value for retracting the belt buckle so as to apply a tension loading on the safety belt for minimizing forward excursions of the seat occupant.

It is a further object of the present invention to provide the "buckle-type" belt tensioning mechanism with means for actuating a stored energy device in response to detection of a vehicular deceleration exceeding the predetermined critical level to automatically retract the belt buckle.

According to the various preferred embodiments, the above objects are accomplished by providing sensing means for sensing the magnitude of a vehicular deceleration and generating a deceleration signal indicative thereof, a lock plate fixed to the vehicle and having a series of locking apertures formed therein, a belt buckle supported for sliding movement on the lock plate from a normal position toward a retracted position, latch means coupled to the belt buckle and engageable with the locking apertures for permitting retraction of the belt buckle and lockingly retaining the belt buckle in the retracted position, a drive mechanism coupled to the belt buckle, a stored energy device acting on the drive mechanism and operable for displacing the drive mechanism so as to cause concurrent movement of the belt buckle from the normal position toward the retracted position, and actuation means for actuating the stored energy device in response to a deceleration signal indicative of a vehicular deceleration exceeded the predetermined critical value.

As an additional object, the belt tensioning mechanism of the present invention can be further equipped with deceleration means for decelerating the belt buckle during retractive movement thereof to mitigate abrupt engagement between the belt buckle and stop means provided on the lock plate, thereby minimizing the shock loading transferred to the belt buckle.

A still further object of the present invention is to provide a secondary latch means between the belt buckle and the lock plate for inhibiting unintended retraction of the belt buckle prior to actuation of the stored energy device. Moreover, the secondary latch means is released in response to actuation of the stored energy device to permit retractive movement of the belt buckle on the lock plate.

BRIEF DESCRIPTION OF THE DRAWINGS

FIG. 5 is a sectional view taken through the drive mechanism and pyrotechnic actuator shown in FIG. 2;

FIG. 7 is a plan view of an alternative lock plate for use with the belt tensioning mechanisms of the present invention;

FIG. 9 is a side view illustrating the over-center triggering linkage associated with the belt tensioning mechanism of FIG. 8.

DETAILED DESCRIPTION OF THE INVENTION

Figure 1:
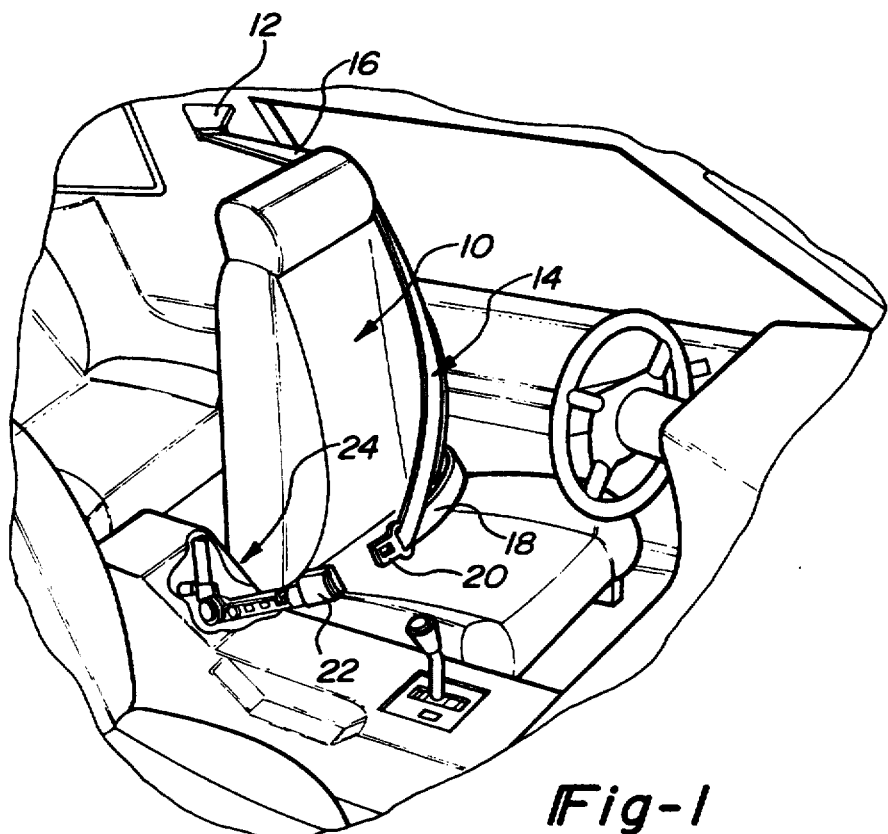
FIG. 1 is a partial interior view of an exemplary motor vehicle showing the functional relationship between a vehicular safety belt restraint system and a belt tensioning mechanism of the present invention.

With reference to FIG. 1, a portion of the interior passenger compartment of an exemplary automotive motor vehicle is shown to include a seat 10 and a safety belt restraint system having a belt retractor 12 mounted on a vertical pillar of the motor vehicle in a conventional manner. A safety or "seat" belt 14 is shown as a combination of a shoulder belt 16 extending from belt retractor 12 and a lap belt 18. As is known, shoulder belt 16 is adapted to extend over the shoulder and across the chest of a seat occupant. A tongue plate 20 is retained on safety belt 14 and is adapted to be releasably latched to a belt buckle 22 in a well known manner. In addition, a belt tensioning mechanism 24 is shown located on the buckle side of seat 10 and is rigidly mounted to the floor (or other structural portion) of the vehicle.

In general, belt tensioning mechanism 24 is provided to enhance the protection afforded to the seat occupant by the safety belt restraint system. More particularly, belt tensioning mechanism 24 is operable to move belt buckle 22 from the "normal" position shown to a rearwardly "retracted" position in response to the motor vehicle being subjected to a deceleration which exceeds a predetermined critical value (i.e., immediately after a vehicular collision). Thus, belt tensioning mechanism 24 is adapted to facilitate the removal of "slack" in safety belt 14 for exerting a tensioning load on the seat occupant which acts to physically restrain the seat occupant in seat 10. Moreover, belt tensioning mechanism 24 is designed to effectively "tighten" seat belt 14 before the inertial forces acting on the seat occupant can pull out any "slack" in seat belt 14. In this manner, forward excursions of the seat occupant within the interior passenger compartment of the motor vehicle are significantly minimized. While shown with a combination seat belt 14, it will be appreciated that belt tensioning mechanism 24 can be used in virtually any safety belt restraint system having at least one of a lap belt 18 and a shoulder belt 16 installed within the passenger compartment of the motor vehicle.

Turning to FIGS. 2 through 10, various preferred embodiments will now be disclosed for belt tensioning mechanism 24. In general, each embodiment includes a combination of various components generally defined by: a lock plate 26 fixed to the vehicle floor structure and having a plurality of locking apertures 28 formed therein; a buckle assembly 30 including belt buckle 22 and a latching mechanism 32 engageable with locking apertures 28 for permitting uni-directional (i.e., "retractive") linear movement of buckle assembly 30 on lock plate; a drive mechanism 34 coupled to buckle assembly 30; a stored energy device 36 that can be selectively actuated for displacing drive mechanism 34 to cause concurrent retractive movement of buckle assembly 30; a sensor 38 for sensing the occurrence and magnitude of a vehicular deceleration condition and generating a deceleration signal indicative thereof; and a controller 40 for actuating stored energy device 36 when the signal from sensor 38 indicates that the vehicular deceleration is greater than the predetermined critical value.

As noted, while various constructions are shown hereinafter for the different embodiments of belt tensioning mechanism 24, the actuation thereof is controlled in response to the signal generated by deceleration sensor 38. Preferably, deceleration sensor 38 is located near a front end portion of the motor vehicle so as to instantaneously detect the occurrence of a deceleration condition (i.e., a frontal impact), thereby reducing the reaction time required to retract belt buckle 22 when the deceleration force detected is greater than the predetermined critical value (for example 7-10 g's). This is particularly advantageous when compared to conventional belt tensioning mechanisms which have the mechanical means (i.e., inertial actuators) for sensing such a deceleration condition located in close proximity to the vehicle seat, since immediate detection of a deceleration condition facilitates quicker retraction of the belt buckle. In motor vehicles equipped with a supplemental restraint airbag system, deceleration sensor 38 can be used for controlling sequential or concurrent actuation of belt tensioning mechanism 24 and the deployment of the airbag restraint. However, to minimize forward excursions of the seat occupant during airbag deployment, it is considered preferable to actuate belt tensioning mechanism 24 prior to deployment of the airbag. In either case, the signal generated by sensor 38 is inputted to a suitable on-board electronic controller unit (ECU) 40 which then controls actuation of stored energy device 36 in response to the deceleration signal.

Figure 2:
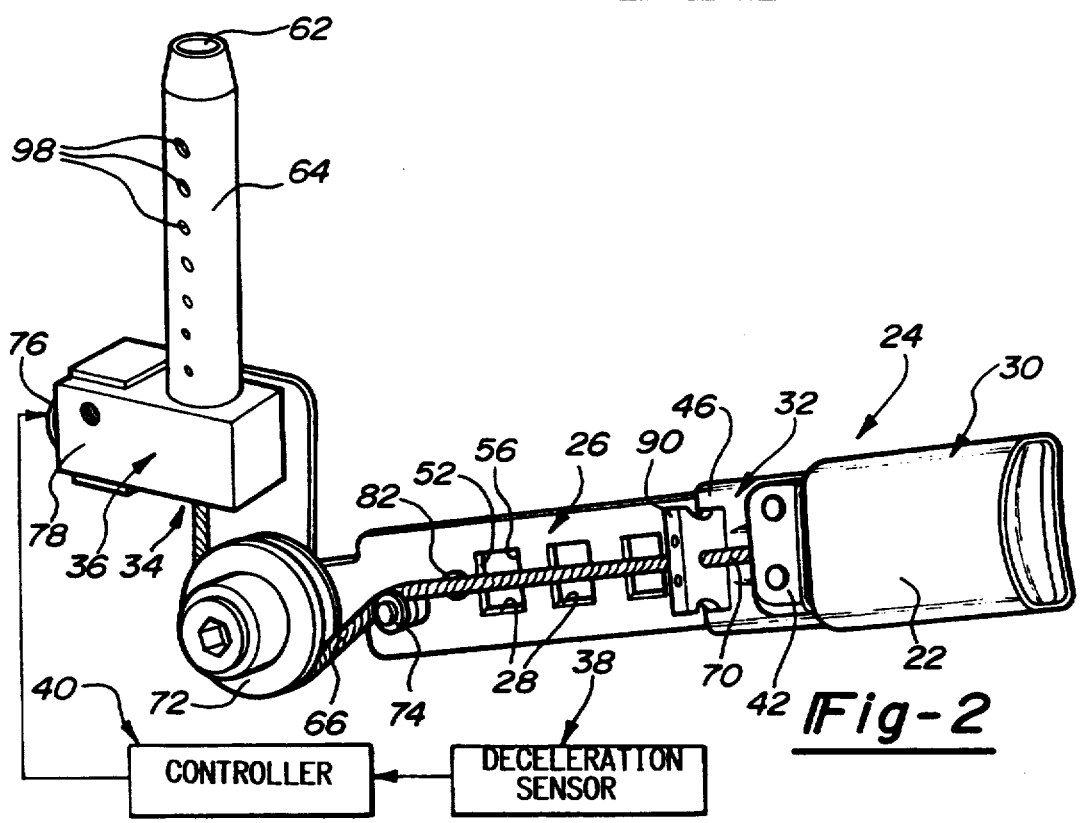
FIG. 2 is a perspective view of one preferred construction for a belt tensioning mechanism of the present invention as shown in a "non-actuated" condition.
Figure 3:
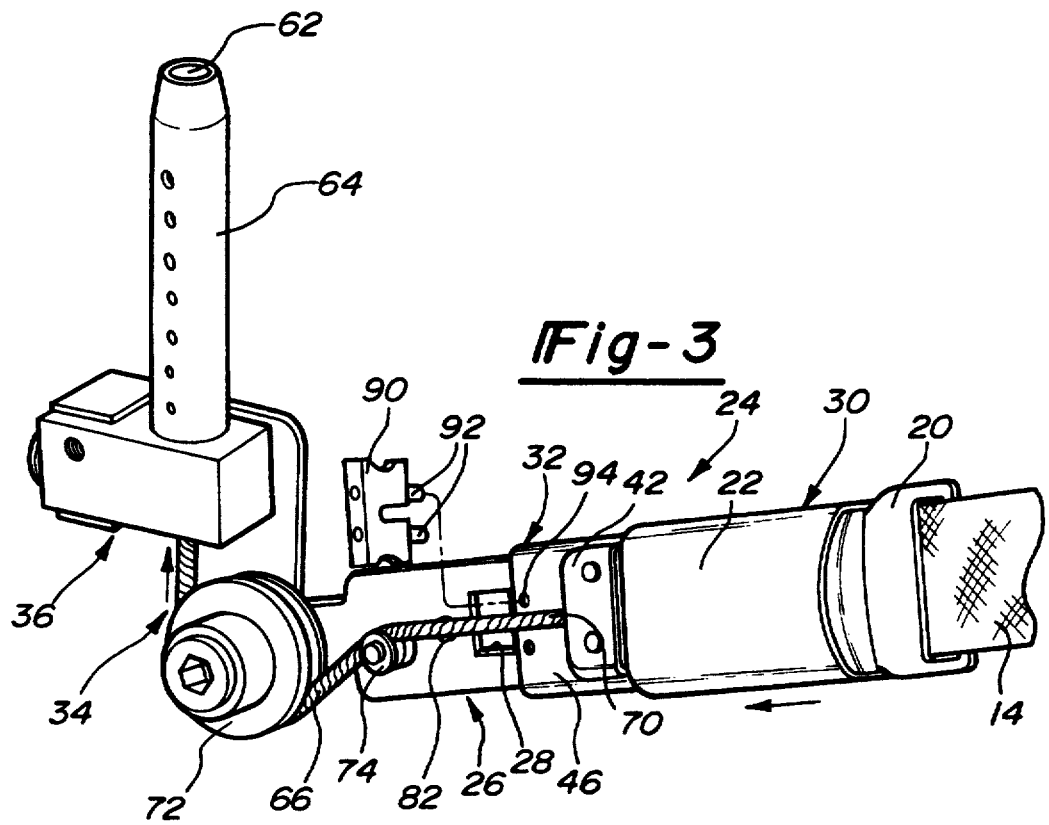
FIG. 3 is a perspective view showing the belt tensioning mechanism of FIG. 2 in an "actuated" condition.

With particular reference now to FIGS. 2 through 5, a first preferred construction for belt tensioning mechanism 24 is disclosed. FIG. 2 shows belt tensioning mechanism 24 in a "non-actuated" condition wherein buckle assembly 30 is maintained in the "normal" position. Similarly, FIG. 3 shows belt tensioning mechanism 24 in an "actuated" condition such that buckle assembly 30 is being forcibly displaced toward the "retracted" position. Buckle assembly 30 is shown to further include a clamp bracket 42 which is provided for securing an anchor extension 44 of belt buckle 22 to a channelled slide bracket 46 of latch mechanism 32. Slide bracket 46 includes a pair of inwardly extending U-shaped lateral edges each defining a longitudinal channel enclosing a lateral edge of lock plate 26 so as to permit slide bracket 46 to move longitudinally on lock plate 26.

Figure 4:
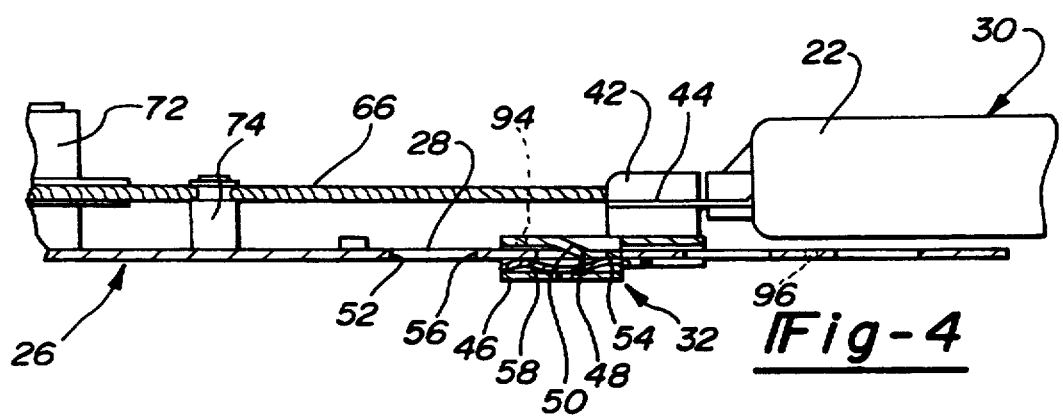
FIG. 4 is a partial sectional view of FIG. 3 illustrating the latching components associated with the belt buckle assembly in greater detail.

As best seen in FIG. 4, a ramped latch tab 48 is formed in slide bracket 46 and is adapted to sequentially engage locking apertures 28 of lock plate 26 upon retractive movement of buckle assembly 30 thereon. More particularly, the inwardly ramped portion 50 of latch tab 48 is adapted to engage and cam over rearward edges 52 of locking apertures 28 to permit such retractive movement of buckle assembly 30. However, once latch tab 48 is positioned within one of locking apertures 28, a forward edge 54 thereof is adapted to engage a forward edge 56 of that locking aperture 28 if a subsequent attempt is made to forwardly move buckle assembly 30, thereby inhibiting such movement. Thus, latching mechanism 32 permits uni-directional movement of buckle assembly 30 toward the retracted position and thereafter provides means for retaining buckle assembly 30 in the retracted position. As an alternative, it is contemplated that upwardly and rearwardly extending ramps could be formed in the web portions of lock plate 26 (i.e., between locking apertures 28) for engaging a latch aperture formed in slide bracket 46 to provide a locking arrangement that performs similarly to that disclosed above. In either case, a biasing arrangement, such as wave spring 58, is provided for maintaining edge 54 of latch tab 48 in an engageable relationship with respect to forward edge 56 of lock plate apertures 28 to ensure inhibition of unintended forward movement of buckle assembly 30 following retraction thereof.

Drive mechanism 34 is shown to include a piston plunger 60 retained for movement within an elongated internal chamber 62 of a tubular piston cylinder 64, and a cable 66 having a first end 68 coupled to plunger 60 and a second end 70 coupled to clamp bracket 42 of buckle assembly 30. A grooved reel 72 and a grooved idler bearing 74 are rotatably supported on lock plate 26 to guide retractive movement of cable 66. In addition, stored energy device 36 includes a pyrotechnic device 76, housed within a casing 78 fixed to lock plate 26, which communicates with a portion 77 of chamber 62 rearward of plunger 60 via a port 80. An electrical signal sent by controller 40 is adapted to ignite pyrotechnic device 76, or a suitable igniter associated therewith, for forcibly propelling piston plunger 60 to move within chamber 62, thereby causing buckle assembly 30 to concurrently move rearwardly on lock plate 26 from the normal position toward the retracted position with latch tab 48 sequentially ratcheting into and out of nested engagement with locking apertures 28. A stop rivet 82, fixed to lock plate 26 adjacent the last locking aperture 28, is provided for engagement with clamp bracket 42, thereby defining the fully retracted position.

In addition to the above, belt tensioning mechanism 24 incorporates other unique features such as a secondary latching arrangement for maintaining buckle assembly 30 in the normal position until pyrotechnic device 76 is actuated, as well as means for decelerating buckle assembly 30 during retractive movement thereof to reduce or "dampen" the shock ultimately transferred to tongue plate 20 upon buckle assembly 30 engaging stop rivet 82. The secondary latching arrangement includes a shear plug 90 having pins 92 which are inserted through sets of aligned bores 94 and 96 formed in slide bracket 46 and lock plate 26, respectively. Pins 92 are designed to shear when a predetermined shear load (about 200 lbs.) is exerted thereon in response to ignition of pyrotechnic device 76, thereby permitting subsequent retraction of buckle assembly 30. With regards to the means for decelerating buckle assembly 30, a plurality of vent holes 98 are formed in piston cylinder 64 which communicate with chamber 62 and which are adapted to vent to atmosphere the pressurized gases generated upon ignition of pyrotechnic device 76, thereby reducing the pressure differential across plunger 60. Vent holes 98 can be similarly sized or varied in size to provide the desired deceleration characteristics. Alternatively, or in combination with vent holes 98, a series of raised deceleration tabs 100 (see FIG. 6) can be formed along one or both lateral edges of lock plate 26 which are adapted to deform upon contact with slide bracket 46 passing thereover. In addition, the elevation or ramp angle of deceleration tabs 100 can be progressively increased to proportionately increase the resistance exerted on slide bracket 46, thereby increasing the rate of deceleration of buckle assembly 30.

Figure 6:
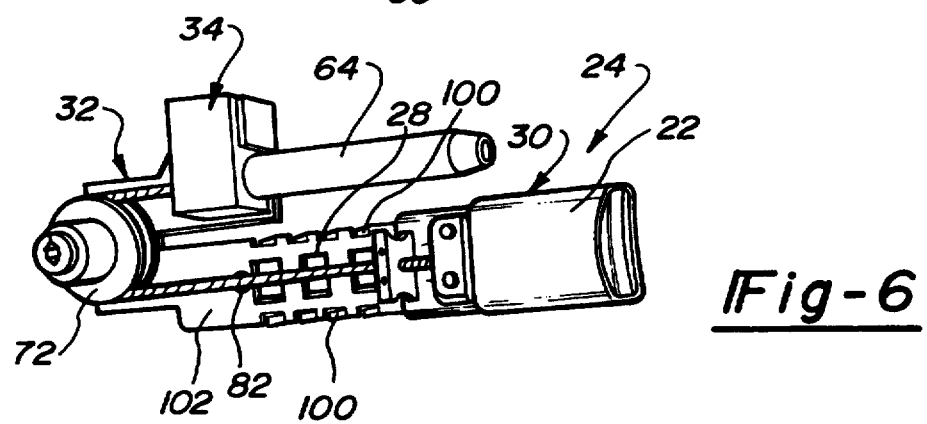
FIG. 6 is a perspective view of an alternative construction for a belt tensioning mechanism of the present invention.

With reference now to FIG. 6, an alternative packaging construction is shown for belt tensioning mechanism 24. In general, the construction and actuation of the belt tensioning mechanism shown in FIG. 6 is similar to that shown in FIGS. 2 through 5 with the exception of the use of a modified lock plate 102. In particular, lock plate 102 is designed to align piston cylinder 64 in generally parallelism with locking apertures 28. As can also be seen, deformable decelerator tabs 100 are formed on both lateral side portions of lock plate 102. A further modification to the lock plate component, identified by reference numeral 106 in FIG. 7, includes means for integrally incorporating reel 72 therein. More specifically, a series of cut-out tabs 104 are formed in lock plate 106 and are deformed out of the general plane thereof to define generally C-shaped guides for cable 66. An aperture 108 is also provided for anchoring lock plate 106 directly to a structural portion of the motor vehicle. In addition, a structural segment 110 of lock plate 106 is provided for mounting pyrotechnic device 76 and piston cylinder 64 in an orientation similar to that shown in FIGS. 2 and 3. Finally, a series decelerator tabs 100 are formed on each lateral edge of lock plate 106.

Figure 8:
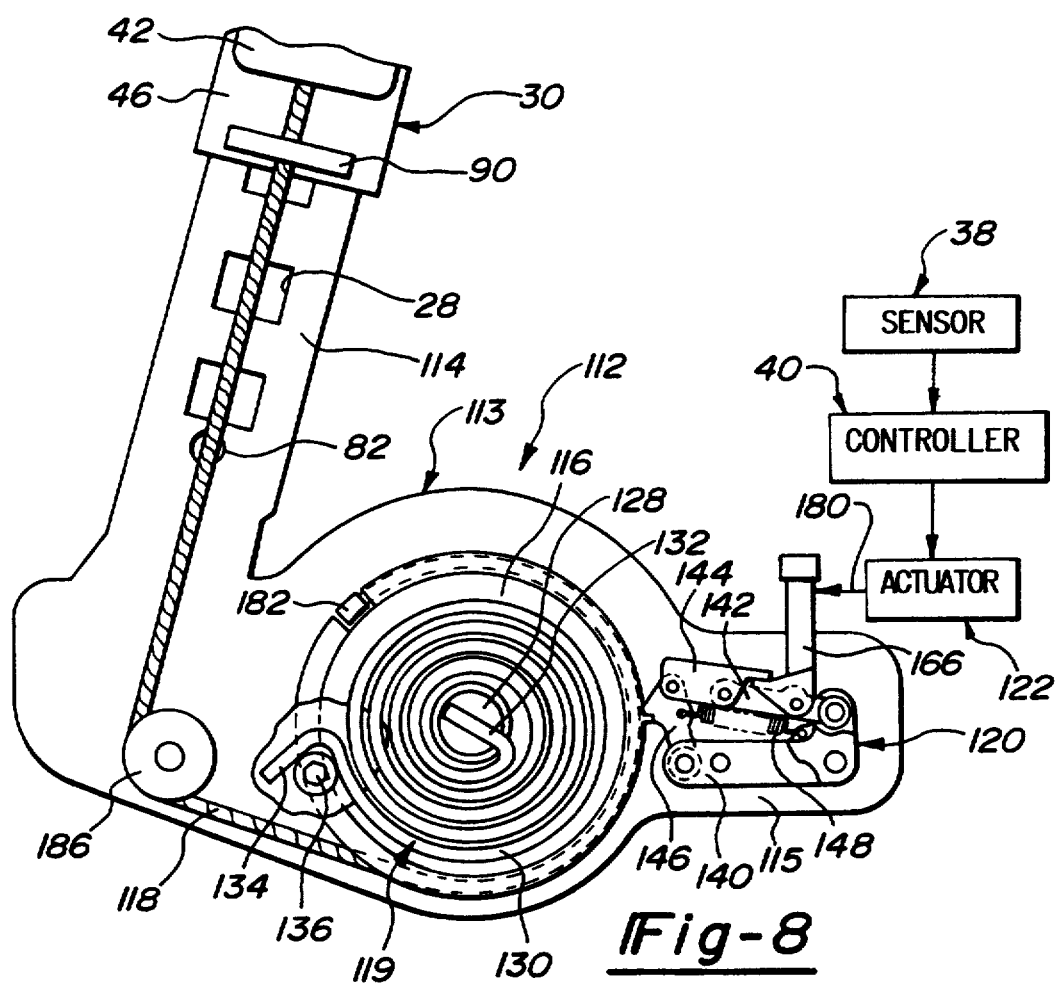
FIG. 8 is a partially cut-away side view of yet another alternative embodiment of a belt tensioning mechanism in a "non-actuated" condition.
Figure 10:
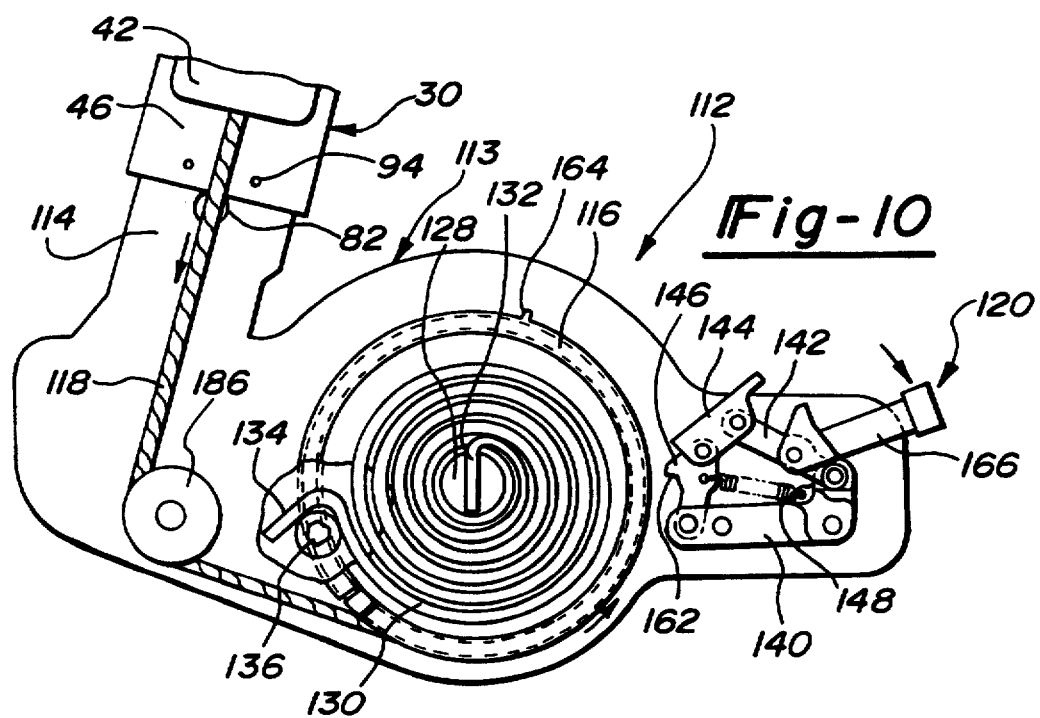
FIG. 10 is a side view, similar to FIG. 8, showing the belt tensioning mechanism in an "actuated" position.

With particular reference now to FIGS. 8 through 10, yet another preferred embodiment of a belt tensioning mechanism 112 is shown. In general, belt tensioning mechanism 112 is a mechanically actuated device having a unique "triggering" arrangement for releasing a preloaded drive mechanism in response to the deceleration signal generated by sensor 38. In general, belt tensioning mechanism 112 is a combination of the lock plate and a sliding buckle arrangement described with reference to FIGS. 2 through 7, and a preloaded drive mechanism similar to that disclosed in commonly owned U.S. Pat. No. 5,211,423.

According to a preferred construction, belt tensioning mechanism 112 includes: a rigid anchor plate 113 having a lock plate segment 114 and a mounting plate segment 115; a grooved reel member 116 retained on mounting plate segment 115 for rotation between a "locked" position and a "released" position; a cable 118 for coupling buckle assembly 30 to driven reel member 116; a stored energy device 119 for exerting a preload on reel member 116; a triggering linkage 120 for maintaining the preloaded reel member 116 in the locked position under normal circumstances, and an electrically-controlled actuator 122 which, under the control of controller 40, is adapted to actuate triggering linkage 120 for releasing preloaded reel member 116 for rotation toward the released position in response to a deceleration signal from sensor 38 indicative of a vehicular deceleration that is greater than the predetermined critical value. As will be appreciated, anchor plate 113 is adapted to be rigidly fixed to a structural portion of the motor vehicle.

Reel member 116 is fixed to a drive rod 128 such that rotation of drive rod 128 causes corresponding rotation of reel member 116. In the embodiment shown, stored energy device 119 is a flat circular rewind spring 130 having a first bent-over end 132 retained within a slot formed in an end of drive rod 128 and a bent-over second end 134 wrapped over a stop pin 136 fixed to anchor plate 113. Rewind spring 130 is operable to transfer a relatively large biasing force to drive rod 128 for rotatably driving reel member 116 between the locked position when belt tensioning mechanism 24 is "non-actuated" (FIG. 8) and the released position when belt tensioning mechanism 114 is "actuated" (FIG. 10). In the "non-actuated" condition, rewind spring 130 is effectively "preloaded" to cause immediate rotation of reel member 116 upon its release. As will be described hereinafter in greater detail, triggering linkage 120 is an over-center toggle linkage that is operable for normally retaining reel member 116 in the locked position in opposition to the large preloaded biasing force exerted thereon by rewind spring 130 when belt tensioning mechanism 112 is in its non-actuated condition.

As best seen from FIGS. 8 through 10, a rigid base member 140 is fixably retained on mounting segment 115 of anchor plate 113 and is provided to operably support over-center toggle linkage 120. In general, over-center toggle linkage 120 is a spring-biased three-bar linkage having a first link 142, a second link 144, a release link 146, and a biasing spring 148. Base 140 is a generally L-shaped member having an upstanding portion defining a pair of laterally-spaced flanges 150. A first end of first link 142 is mounted between laterally-spaced flanges 150 for pivotal movement about a pivot pin 152. A second end of first link 142 is coupled to a first end of second link 144 for pivotal movement about pivot pin 154. The opposite end of second link 144 is coupled to an upper portion of release latch 146 for pivotal movement about pivot pin 156. Finally, the lower end of release latch 146 is coupled for pivotal movement between a pair of laterally-spaced flanges 158 formed at the terminal end of horizontally extending portion of L-shaped base member 140. More particularly, the lower end of release latch 146 is pivotably retained between flanges 158 via a pivot pin 160. A first end of biasing spring 148 is secured to intermediate portion of release latch 146 while its opposite end is secured to base 140. Furthermore, release latch 146 includes a transversely extending shoulder 162 which is provided for releasable engagement with a ledge 164 formed on reel member 116.

A pendulum-type trigger bar 166 is pivotally retained on a central portion of first link 142 via pivot pin 168. More particularly, trigger bar 166 includes a wedge-shaped hinge bracket 170 pivotally supported via hinge pin 168 to first link 142. An elongated shaft portion 172 of trigger bar 166 is rigidly fixed to hinge bracket 170.

Hinge bracket 170 includes rearwardly extending projection defining a planar surface 174 that is adapted to coact with a planar underside surface 176 on a forwardly extending projection 178 formed on second link 144. In operation, an actuator output member, as schematically indicated by arrow 180 in FIG. 8, is adapted to forcibly act on shaft portion 172 of trigger bar 166 to rotate it (clockwise in FIG. 8) when actuator 122 is controllable actuated via an electrical signal from controller 40 in response to the signal generated by deceleration sensor 38. Finally, it is contemplated that actuator 122 could be a solenoid actuator, a small pyrotechnic device, or an equivalent device capable of rapidly actuating trigger linkage 120 in response to an output signal from controller 40.

With continued reference to FIGS. 8 through 10, reel member 116 is shown as a disk-like plate provided for retracting a predetermined length of cable 118 upon actuation of belt tensioning mechanism 112. A ferrule 182 is secured at one end of cable 118 while the opposite end of the cable is fixedly secured to clamp bracket 42 of buckle assembly 30. A cable guide reel 186 is provided for routing cable 118 onto reel member 116. Reel member 116 includes a channel-like groove for receiving cable 118 once reel member 116 has been put in motion upon release of preloaded rewind spring 130 via controlled actuation of triggering linkage 120.

FIGS. 8 and 9 illustrate triggering linkage 120 in a first or "under-center" position for retaining reel member 116 in its locked position in opposition to the biasing of rewind spring 130. More particularly, an axis 188, drawn between pivots 152 and 156 in FIG. 9, illustrates pivot 154 to be under-center relative thereto, thereby maintaining release latch 146 in locked engagement with ledge 164 of reel member 116. This unique feature permits toggle linkage 120 to controllably retain the relatively large preload force exerted by rewind spring 130 on release latch 146, yet trigger linkage 120 may be easily triggered upon sufficient pivotal movement of shaft 172 by actuator output member 182 to rotate pivot 154 over-center of axis 188. It will be appreciated that, once toggle linkage 120 has been tripped, the preloaded biasing force of rewind spring 130 acts to drivingly rotate reel member 116 (counterclockwise in FIG. 10) for winding cable 118 thereon which, in turn, causes belt buckle 22 to move to the retracted position. In a manner previously disclosed, latch mechanism 32 is associated with buckle assembly 30 and locking apertures 28 of lock plate portion 114 for inhibiting subsequent withdrawal of buckle assembly 30 from its retracted position. Additionally, the preload exerted by rewind spring 130 is selected to overcome (i.e., shear) shear pins 92 upon release thereof. Stop rivet 82 is again shown for providing means to establish the fully retracted position of buckle assembly 30. While not shown it is contemplated that lock plate segment 114 would include deceleration tabs 100 similar to that in FIG. 6 for decelerating buckle assembly 30.

The foregoing discussion discloses and describes exemplary embodiments of the present invention. One skilled in the art will readily recognize from such discussion, and from the accompanying drawings and claims, that various changes, modifications and variations can be made therein without departing from the true spirit and fair scope of the invention as defined in the following claims.

What is claimed is:

1. A belt tensioning mechanism for use in a motor vehicle to retract a belt buckle from a normal position to a retracted position, said belt tensioning mechanism comprising:

sensing means for sensing the magnitude of a vehicular deceleration and generating a deceleration signal indicative thereof;

an elongated lock plate defining substantially parallel side edge and having a series of locking apertures formed therein at spaced locations therealong;

a drive mechanism coupled to said belt buckle;

a stored energy device operable for forcibly displacing said drive mechanism so as to cause concurrent movement of said belt buckle from said normal position toward said retracted position;

actuation means for actuating said stored energy device in response to said deceleration signal indicating a vehicular deceleration exceeding a predetermined critical value; and a latch assembly coupled to said belt buckle for lockingly retaining said belt buckle in said retracted position, said latch assembly including a slide bracket mounted for slidable movement along said lock plate and defining a pair of channels for slidably engaging the side edges of said lock plate and a latch tab adapted to sequentially ratchet over said locking apertures in said lock plate during movement toward said retracted position and to lockingly engage a locking aperture to prevent subsequent return movement of said latch assembly and belt buckle toward said normal position from said retracted position.

2. The belt tensioning mechanism of claim 1 further comprising deceleration means for decelerating said belt buckle during retractive movement thereof to mitigate abrupt engagement between said belt buckle and a stop member provided on said lock plate, thereby minimizing the shock loading transferred to said belt buckle.

3. The belt tensioning mechanism of claim 2 wherein said deceleration means includes a series of deformable tabs formed on said lock plate for engagement with said latch assembly during retractive movement thereof.

4. The belt tensioning mechanism of claim 1 further comprising secondary latch means for lockingly retaining said belt buckle in said normal position on said lock plate for inhibiting unintended retraction of said belt buckle prior to actuation of said stored energy device.

5. The belt tensioning mechanism of claim 4 wherein said secondary latch means is released in response to actuation of said stored energy device to permit retractive movement of said belt buckle on said lock plate.

6. The belt tensioning mechanism of claim 1 wherein said drive mechanism includes a piston retained for movement within a chamber of an elongated cylinder, and a cable coupling said belt buckle to said piston, and wherein said stored energy device is a pyrotechnic device that is selectively ignited by said actuation means in response to said deceleration signal to forcibly move said piston within said cylinder for causing concurrent movement of said belt buckle from said normal position toward said retracted position.

7. The belt tensioning mechanism of claim 6 wherein said actuation means is a controller device operable for receiving said deceleration signal from said sensing means and generating an electrical signal for igniting said pyrotechnic device when said deceleration signal is greater than said predetermined critical value.

8. The belt tensioning mechanism of claim 6 further comprising deceleration means for decelerating said belt buckle during retractive movement thereof, said deceleration means including a series of vent holes formed in said cylinder for venting pressurized gases generated upon ignition of said pyrotechnic device to reduce the pressure differential on opposite sides of said piston within said chamber.

9. The belt tensioning mechanism of claim 1 wherein said sensing means is located to sense a deceleration condition occurring at a front end portion of said motor vehicle.

10. The belt tensioning mechanism of claim 1 wherein said drive mechanism includes a reel member and a cable coupling said belt buckle to said reel member, said stored energy device includes a spring member exerting a preloaded biasing force on said reel member, and said actuation means includes linkage means movable between a first position for normally retaining said reel member in a preloaded locked position and a second position for releasing said reel member to permit driven rotation thereof for causing concurrent movement of said belt buckle toward said retracted position, said actuation means further including an actuator device operable for moving said linkage means from said first position to said second position and controller means for selectively actuating said actuator device in response to said deceleration signal.

11. A belt tensioning mechanism for use in a motor vehicle to retract a belt buckle for applying a tensioning load on a seat belt, said belt tensioning mechanism comprising:

a lock plate having a plurality of locking apertures formed therein;

a buckle assembly including said belt buckle and a latching mechanism engageable with said locking apertures for permitting uni-directional movement of said buckle assembly on said lock plate from a normal position toward a retracted position;

a drive mechanism coupled to said buckle assembly;

a stored energy device that can be selectively actuated for displacing said drive mechanism to cause concurrent movement of said buckle assembly toward said retracted position;

sensor means for sensing the occurrence and magnitude of a vehicular deceleration condition and generating a deceleration signal indicative thereof; and actuation means for actuating said stored energy device when the signal from said sensor means indicates that the vehicular deceleration is greater than a predetermined critical value;

said lock plate having formed thereon a series of deformable tabs for engagement with said buckle assembly for decelerating said buckle assembly during retractive movement thereof to mitigate abrupt engagement of said buckle assembly with a stop member on said lock plate.

12. The belt tensioning mechanism of claim 11 wherein said sensor means is located near a front end portion of the motor vehicle so as to instantaneously detect the occurrence of a deceleration condition, thereby reducing the reaction time required to retract said buckle assembly when the deceleration force detected is greater than said predetermined critical value.

13. The belt tensioning mechanism of claim 11 further comprising secondary latch means for lockingly retaining said buckle assembly in said normal position on said lock plate for inhibiting unintended retraction of said buckle assembly prior to actuation of said stored energy device.

14. The belt tensioning mechanism of claim 13 wherein said secondary latch means is released in response to actuation of said stored energy device to permit retractive movement of said buckle assembly on said lock plate.

15. The belt tensioning mechanism of claim 11 wherein said drive mechanism includes a piston retained for movement within a chamber of an elongated cylinder, and a cable coupling said buckle assembly to said piston, and wherein said stored energy device is a pyrotechnic device that is selectively ignited by said actuation means in response to said deceleration signal for forcibly propelling said piston to move within said cylinder chamber for causing concurrent movement of said buckle assembly from said normal position toward said retracted position.

16. The belt tensioning mechanism of claim 15 wherein said actuation means includes a controller device that is operable for receiving said deceleration signal from said sensor means and generating an electrical signal for igniting said pyrotechnic device when said deceleration signal is greater than said predetermined critical value.

17. The belt tensioning mechanism of claim 11 wherein said latching mechanism includes a ramped latch tab formed on said belt assembly which is adapted to sequentially ratchet over said locking apertures on said lock plate during retractive movement, said latch tab having a latch edge surface engageable with a corresponding edge surface of each of said locking apertures to inhibit subsequent return movement of said buckle assembly toward said normal position following retraction thereof.

18. The belt tensioning mechanism of claim 11 wherein said drive mechanism includes a reel member and a cable coupling said buckle assembly to said reel member, said stored energy device includes a spring member exerting a preloaded biasing force on said reel member, and said actuation means includes linkage means movable between a first position for normally retaining said reel member in a preloaded locked position and a second position for releasing said reel member to permit driven rotation thereof for causing concurrent movement of said buckle assembly toward said retracted position, an actuator device operable for moving said linkage means from said first position to said second position, and controller means operable for selectively actuating said actuator device in response to said deceleration signal.

19. A safety belt restraint system for use in a motor vehicle comprising:
a safety belt having a tongue plate retained thereon;
a belt buckle for releasably locking said tongue plate; and
belt tensioning means for moving said belt buckle from a normal position to a rearwardly retracted position in response to a deceleration exceeding a predetermined critical value, said belt tensioning means comprising sensing means for sensing the magnitude of a deceleration and generating a deceleration signal indicative thereof, an elongated lock plate defining substantially parallel side edges and having a series of locking apertures formed therein at spaced locations therealong, a drive mechanism coupled to said belt buckle, a stored energy device operable for forcibly displacing said drive mechanism so as to cause concurrent movement of said belt buckle from said normal position toward said retracted position, actuation means for actuating said stored energy device in response to said deceleration signal indicating a vehicular deceleration exceeding a predetermined critical value, and a latch assembly coupled to said belt buckle for lockingly retaining said belt buckle in said retracted position, said latch assembly including a slide bracket mounted for slidable movement along said lock plate and defining a pair of channels for slidably engaging the side edges of said lock plate and a latch tab adapted to sequentially ratchet over said locking apertures in said lock plate during movement toward said retracted position and to lockingly engage a locking aperture to prevent subsequent return movement of said latch assembly and belt buckle toward said normal position from said retracted position.

20. The safety belt restraint system of claim 19 further comprising secondary latch means for lockingly retaining said belt buckle in said normal position on said lock plate for inhibiting unintended retraction of said belt buckle prior to actuation of said stored energy device, and wherein said secondary latch means is released in response to actuation of said stored energy device to permit retractive movement of said belt buckle on said lock plate.

21. The safety belt restrain system of claim 19 wherein said drive mechanism includes a piston retained for movement within an elongated cylinder, and a cable coupling said belt buckle to said piston, and wherein said stored energy device is a pyrotechnic device that is selectively ignited in response to said deceleration signal to forcibly propel said piston to move within said cylinder for causing concurrent movement of said belt buckle from said normal position toward said retracted position.

22. The safety belt restraint system of claim 21 wherein said actuation means includes a controller device operable for receiving said deceleration signal from said sensing means and generating an electrical signal for igniting said pyrotechnic device when said deceleration signal is greater than said predetermined critical value.

23. The safety belt restraint system of claim 19 further comprising deceleration means for decelerating said belt buckle during retractive movement thereof.

24. The safety belt restraint system of claim 23 wherein said deceleration means includes a series of deformable tabs formed on said lock plate for engagement with said latch assembly during retractive movement thereof.

25. The safety belt restraint system of claim 19 wherein said drive mechanism includes a reel member and a cable coupling said belt buckle to said reel member, said stored energy device includes a spring member exerting a preloaded biasing force on said reel member, and said actuation means includes linkage means movable between a first position for normally retaining said reel member in a preloaded locked position and a second position for releasing said reel member to permit driven rotation thereof for causing concurrent movement of said belt buckle toward said retracted position, said actuation means further including an actuator device operable for moving said linkage means from said first position to said second position and controller means for selectively actuating said actuator device in response to said deceleration signal.

26. The safety belt restraint system of claim 19 wherein said sensing means is located near a front end portion of the motor vehicle so as to instantaneously detect the occurrence of a deceleration condition, thereby reducing the reaction time required to retract said belt buckle when the deceleration force detected is greater than said predetermined critical value.

* * * * *